United States Patent
Ozawa et al.

(10) Patent No.: US 7,430,108 B2
(45) Date of Patent: Sep. 30, 2008

(54) ELECTROLYTE FOR ELECTROLYTIC CAPACITOR AND ELECTROLYTIC CAPACITOR CONTAINING THE SAME

(75) Inventors: Masashi Ozawa, Tokyo (JP); Minoru Wada, Tokyo (JP); Masayuki Takeda, Ibaraki (JP); Makoto Ue, Ibaraki (JP)

(73) Assignees: Nippon Chemi-con Corporation, Tokyo (JP); Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/533,918

(22) PCT Filed: Nov. 7, 2003

(86) PCT No.: PCT/JP03/14218

§ 371 (c)(1),
(2), (4) Date: Mar. 22, 2006

(87) PCT Pub. No.: WO2004/042759

PCT Pub. Date: May 21, 2004

(65) Prior Publication Data

US 2006/0250751 A1    Nov. 9, 2006

(30) Foreign Application Priority Data

Nov. 8, 2002   (JP) .............................. 2002-326019
Nov. 8, 2002   (JP) .............................. 2002-326028
Nov. 11, 2002  (JP) .............................. 2002-326723

(51) Int. Cl.
    *H01G 9/00*    (2006.01)
(52) U.S. Cl. ................ 361/523; 361/525; 361/527; 361/529; 361/516; 361/519; 29/25.01; 29/25.03

(58) Field of Classification Search ......... 361/523–525, 361/527–534, 516–519; 29/25.01, 25.03; 252/62.2
See application file for complete search history.

(56) References Cited

U.S. PATENT DOCUMENTS

| | | | |
|---|---|---|---|
| RE31,743 E | 11/1984 | Arora et al. | |
| 5,874,184 A * | 2/1999 | Takeuchi et al. | ............ 429/314 |
| 6,262,879 B1 | 7/2001 | Nitta et al. | |
| 6,274,061 B1 * | 8/2001 | Tamamitsu | ................. 252/62.2 |
| 6,303,249 B1 * | 10/2001 | Sonobe et al. | ........... 429/231.4 |
| 6,479,192 B1 * | 11/2002 | Chung et al. | ................. 429/338 |
| 6,721,168 B2 * | 4/2004 | Takeuchi et al. | ............ 361/502 |
| 2004/0095708 A1 | 5/2004 | Takeda et al. | |
| 2006/0152882 A1 * | 7/2006 | Takeda et al. | ............... 361/272 |

FOREIGN PATENT DOCUMENTS

| | | |
|---|---|---|
| CN | 1511327 | 7/2004 |
| JP | 8321442 | 12/1996 |
| JP | 11067600 A | 3/1999 |
| JP | 2001102265 A | 4/2001 |
| JP | 2003142346 | * 5/2003 |

* cited by examiner

*Primary Examiner*—Nguyen T Ha
(74) *Attorney, Agent, or Firm*—Young & Thompson

(57) ABSTRACT

Electrolyte solution and an electrolytic capacitor using it having a low impedance characteristic, having a high withstand voltage characteristic of 100V class, and a high temperature life characteristic is provided. The electrolyte solution containing an aluminum tetrafluoride salt, and a solvent with high boiling point, such as sulfolane, 3-methyl sulfolane, and 2,4-dimethyl sulfolane, and the like are used. The electrolytic capacitor of the present invention has a low impedance characteristic, a high withstand voltage characteristic, and an excellent high temperature life characteristic.

5 Claims, No Drawings

ELECTROLYTE FOR ELECTROLYTIC CAPACITOR AND ELECTROLYTIC CAPACITOR CONTAINING THE SAME

FIELD OF THE INVENTION

The present invention relates to an electrolytic capacitor for an electrolytic capacitor and the electrolytic capacitor using it, especially, the electrolyte solution and the electrolytic capacitor using it having a low impedance characteristic and a high withstand voltage characteristic.

BACKGROUND OF THE INVENTION

An electrolytic capacitor typically has an anode electrode foil made of a band-shaped high purity aluminum foil where the effective aluminum foil surface has been enlarged through etching process chemically or electrochemically, and an oxide film is formed on the surface, through a chemical process of treating the aluminum foil with a chemical solution such as ammonium borate aqueous solution and the like. A cathode electrode foil is also made of an etched aluminum foil of high purity. Capacitor element is formed by the anode electrode foil and the cathode electrode foil, wound together with intervening separator made of manila paper and the like. Next, the capacitor element 1, after impregnating with an electrolyte solution for driving the electrolytic capacitors, is housed into a bottomed outer case made of aluminum and the like. The outer case is equipped at the opening with a sealing member made of an elastic rubber, and is sealed by drawing.

Herewith, as electrolyte solution for driving the electrolytic capacitor having high conductivity, and to be impregnated to the capacitor element, wherein γ-butyrolactone is employed as the main solvent composed of quaternized cyclic amidin compounds (imidazolinium cation and imidazolium cation) as the cationic component and acid conjugated bases as the anionic component are dissolved therein as the solute (refer to Unexamined Published Japanese Patent Application No. H08-321449 and No. H08-321441)

However, due to the remarkable development of digital information devices in recent years, the high-speed driving frequency of micro-processor which is a heart of these electronic information devices is in progress. Accompanied by the increase in the power consumption of electronic components in the peripheral circuits, the ripple current is increased abnormally, and there is a strong demand for the electrolytic capacitors used in these circuits to have a low impedance characteristic. Moreover, in the field of vehicles, with the recent tendency toward improved automobile functions, a low impedance characteristic is in high demand. By the way, the driving voltage of the vehicle circuit of 14V has been progressed to 42V accompanied by the increase in the power consumption. To comply with such a driving voltage, the electrolytic capacitor requires the withstand voltage characteristic of 28V and 84V and more.

DISCLOSURE OF INVENTION

The present invention aims to supply electrolyte solution for an electrolytic capacitor and the electrolytic capacitor using it, having an excellent high temperature characteristic, a low impedance characteristic, and a high withstand voltage characteristic of 100V class.

The present invention is characterized in that electrolyte solution for the electrolytic capacitor contains an aluminum tetrafluoride salt and a solvent with high boiling point.

Moreover, the present invention is characterized in that the sulfolane, 3-methyl sulfolane, and 2,4-dimethyl sulfolane are used as the solvent with high boiling point.

Further, the electrolytic capacitor of the present invention utilizes the aforementioned electrolyte solution.

BEST MODE TO CARRYING OUT THE INVENTION

The electrolyte solution of the electrolytic capacitor used in the present invention contains an aluminum tetrafluoride salt and a solvent with high boiling point, and a high sparking voltage, and a low specific resistance characteristic. The high temperature stability is also excellent.

As the aluminum tetrafluoride salt constituting the aluminum tetrafluoride as anion component, examples of this salt include an ammonium salt, an amine salt, a quaternary ammonium salt, or a quaternary cyclic amidinium ion as cation component, can be used. Examples of an amine constituting the amine salt include a primary amine (such as methylamine, ethylamine, propylamine, butylamine, ethylenediamine, monoethanolamine, and the like); secondary amine (such as dimethylamine, diethylamine, dipropylamine, ethy-methylamine, diphenylamine, diethanolamine and the like); and tertiary amine (such as trimethylamine, triethylamine, tributylamine, triethanolamine, and the like). Examples of a quaternary ammonium constituting the quaternary ammonium salt include a tetraalkylammonium (such as tetramethylammonium, tetraethylammonium, tetrapropylammonium, tetrabutylammonium, methyltriethylammonium, di-methyldiethylammonium and the like) and a pyridinium (such as 1-methylpyridinium, 1-ethylpyridinium, 1,3-diethylpyridinium and the like).

Furthermore, as for salt containing the quaternized cyclic amidinium ion as a cationic component, the quaternized cyclic amidinium ion is a cation formed by quaternized a cyclic compound having an N,N,N'-substituted amidine group, and the following compounds are exemplified as the cyclic compound having an N,N,N'-substituted amidine group. They are an imidazole monocyclic compound (for example, an imidazole homologue, such as 1-methylimidazole, 1-phenylimidazole, 1,2-dimethyl-imidazole, 1-ethyl-2-methylimidazole, 2-ethyl-1-methylimidazole, 1,2-diethylimidazole, 1,2,4-trimethylimidazole and the like, an oxyalkyl derivative, such as 1-methyl-2-oxymethylimidazole, 1-methyl-2-oxyethyl-imidazole, and the like, a nitro derivative such as 1-methyl-4(5)-nitroimidazole, and the like, and an amino derivative such as 1,2-dimethyl-5(4)-aminoimidazole, and the like), a benzoimidazole compound (such as 1-methylbenzoimidazole, 1-methyl-2-benzylbenzoimidazole, 1-methyl-5(6)-nitrobenzo-imidazole and the like), a compound having a 2-imidazoline ring (such as 1-methylimidazoline, 1,2-dimethylimidazoline, 1,2,4-trimethylimidazoline, 1-methyl-2-phenylimidazoline, 1-ethyl-2-methylimidazoline, 1,4-dimethyl-2-ethyl-imidazoline, 1-methyl-2-ethoxymethylimidazoline, and the like), a compound having a tetrahydropyrimidine ring (such as 1-methyl-1,4,5,6-tetrahydropyrimidine, 1,2-dimethyl-1,4,5,6-tetrahydropyrimidine, 1,8-diazabicyclo[5,4,0] undecen-7,1,5-diazabicyclo[4,3,0]-nonene-5, and the like), and the like.

Examples of the solvent with high boiling point utilized in the present invention include the followings. Namely, sulfolane series such as sulfolane, 3-methyl sulfolane, 2,4-dimethyl sulfolane, 1,3-diethyl-2-imidazoridinone, 1,3-dipropyl-2-imidazoridinone, 1-methyl-3-ethyl-2-imidazoridinone, and the like; 1,3,4-trialkyl-2-imidazoridinone such as 1,3,4-trimethyl-2-imidazoridinone, and the like; 1,3,4,5-tetraalkyl- 2-imidazoridinone such as 1,3,4,5-tetramethyl-2-imidazoridinone, and the like, 3-ethyl-1,3-oxazolidine-2-one, and the like; and carbonates such as ethylene carbonate, propylene carbonate, and the like. Among these, sulfolane, 3-methyl sulfolane, and 2,4-dimethyl sulfolane are preferably used because of their excellence moisture resistance characteristics. That is, normally, a cathode current passes through the cathode electrode lead to generate hydroxyl ion, and the basicity increases. However, these solvents do not decompose even at pH value of 7 and more, which is effective in preventing the leakage caused by decomposition of solvents in case of using the quaternary cyclic amidium salt.

The solvent in use for an electrolyte solution according to the present invention comprises a polar protic solvent, a polar aprotic solvent, and their mixture thereof. Examples of the polar protic solvent include monohydric alcohols (such as ethanol, propanol, butanol, pentanol, hexanol, cyclo-butanol, cyclo-pentanol, cyclo-hexanol, benzyl alcohol, and the like); and polyhydric alcohol and oxy alcohol compounds (such as ethylene glycol, propylene glycol, glycerine, methyl cellosolve, ethyle cellosolve, methoxy propylene glycol, dimethoxy propanol, and the like). Moreover, representative examples of the aprotic polar solvent include amide series (such as N-methylformamide, N,N-dimethylformamide, N-ethylformamide, N,N-diethylformamide, N-methyl acetamide, $N_7$N-dimethyl acetamide, N-ethyl acetamide, N,N-diethyl acetamide, hexamethylphosphoric amide, and the like); lactone compounds (such as γ-butyrolactone, δ-valerolactone, γ-valerolactone, and the like); sulfolane series (such as sulfolane, 3-methyl sulfolane, 2,4-dimethyl sulfolane, and the like); cyclic amide compounds (such as N-methyl-2-pyrrolidone, and the like); carbonate compounds (such as ethylene carbonate, propylene carbonate, isobutylene carbonate, and the like); nitrile compound (such as acetonitrile, and the like); sulfoxide compound (such as dimethyl sulfoxide, and the like); 2-imidazolidinone solvents [for example, 1,3-dialkyl-2-imidazoridinone (such as 1,3-dimethyl-2-imidazoridinone, 1,3-diethyl-2-imidazoridinone, 1,3-di(n-propyl)-2-imidazoridinone, and the like); and 1,3,4-trialkyl-2-imidazoridinone (such as 1,3,4-trimethyl-2-imidazoridinone, and the like)], and the like.

Further, the content of solvents with high boiling point in the solvent is less than 25% by weight, preferably is ranging from 1 to 20% by weight, and more preferably is ranging from 3 to 15% by weight. The specific resistance increases beyond this range, and the high temperature stability increases beyond the lower limit.

According to electrolyte solution for an electrolytic capacitor of the present invention has the low impedance characteristic, and the high withstand voltage characteristic of 100V class, the high sparking voltage, and the excellent high temperature stability, The electrolytic capacitor using this electrolyte solution has a low impedance characteristic and high withstand voltage characteristic of 100V class, and an excellent high temperature life characteristic.

Structure of this electrolytic capacitor is similar to the first electrolytic capacitor. The electrode foil subjected to phosphate treatment is used as the electrode foils. The present invention is still effective by using the electrode foil subjected to phosphate treatment as one of the cathode electrode foil and the anode electrode foil. Deterioration of both foils is prevented if this is applied to both foils so normally both foils are subjected to phosphate treatment. Normally, the aluminum foil of high purity is subjected to chemical or electrochemical etching to obtain the etching foil, however, as the electrode foil of the present invention, the etching foil obtained by performing the phosphate aqueous solution impregnation process before, during, or after the etching process is used as the cathode electrode foil. Further, as the anode electrode foil, the etching foil, the etching foil untreated with phosphate is subjected to phosphate synthesis, or the electrode foil that performed the phosphate impregnation process before, during, or after the chemical treatment is used.

Furthermore, the effect of the present invention improves by adding the phosphorous compounds to the electrolyte solution of the electrolytic capacitor described above. Examples of phosphorus compounds and salts thereof include orthophosphoric acid, phosphonous acid, hypophosphorus acid and their salts. As the salts of the phosphorus compounds, an ammonium salt, an aluminum salt, a sodium salt, a calcium salt, and a potassium salt can be used. Moreover, examples of phosphorous compound include ethyl phosphate, diethyl phosphate, butyl phosphate, dibutyl phosphate and the like; and phosphonate such as 1-hydroxyethylidene-1,1-diphosphonic acid, aminotrimethylene phosphonic acid, phenyl phosphonic acid, and the like. Moreover, examples of phosphinate include methyl phosphinate, butyl phosphinate, and the like.

Furthermore, examples of condensed phosphates include straight-chain condensed phosphates such as pyrophosphoric acid, tripolyphosphoric acid, tetrapolyphosphoric acid, and the like; cyclic condensed phosphates such as metaphosphate, hexametaphosphate, and the like, or the combination of the chain condensed phosphate and cyclic condensed phosphate. Further, as salts of these condensates, an ammonium salt, an aluminum salt, a sodium salt, a calcium salt, a potassium salt, and the like can be used.

The addition amount is ranging from 0.05 to 3% by weight, and preferably is ranging from 0.1 to 2% by weight.

The electrolytic capacitor of the present invention described above has a low impedance characteristic and a high withstand voltage of 100V class, and an excellent high temperature life characteristic. In other words, in case of performing the high temperature life test by using the aluminum tetrafluoride salt, the reactivity of the electrolyte solution with the electrode foil gets large due to the moisture inside the electrolyte solution, and the characteristics are affected. However, since the electrolytic capacitor of the present invention utilizes the electrode foil subjected to phosphate treatment, the reaction of the electrode foil with the electrolyte solution is controlled, whereby the high temperature life characteristic is stabilized.

Furthermore, as for first to third electrolytic capacitor of the present invention, a partial cross-linking peroxide butyl rubber that added peroxide as cross-linking agent to a butyl rubber polymer comprised of isobutylene, isoprene, and divinylbenzene copolymer is used as the sealing member. Examples of vulcanizing agents used in the vulcanization of peroxides include ketone peroxides, peroxy ketals, hydroperoxides, dialkyl peroxides, diacyl peroxides, peroxy dicarbonates, peroxy esters, and the like. Specific examples are 1,1-bis-t-butylperoxy-3,3,5-trimethylcyclohexane, n-butyl-4,4-bis-t-butylperoxy-valerate, dicumyl peroxide, t-butyl-peroxy-benzoate, di-t-butyl-peroxide, benzoyl peroxide, 1,3-bis (t-butyl peroxy-isopropyl) benzene, 2,5-dimethyl-2,5-di-t-butylperoxyl-hexene-3, t-butyl peroxy cumene, α, α'bis(t-butylperoxy) diisopropylbenzene, and the like.

According to the electrolytic capacitor of the present invention, a partial cross-linking peroxide butyl rubber that added peroxide as cross-linking agent to a butyl rubber polymer comprised of isobutylene, isoprene, and divinylbenzene copolymer is used as the sealing member. The electrolyte solution containing the aluminum tetrafluoride salt is used.

The electrolytic capacitor of the present invention has a low impedance characteristic, and a high withstand voltage characteristic of 100V class. The high temperature life characteristic is improved further by the excellent high temperature characteristics of the electrolyte solution and the sealing member of the present invention.

Moreover, the quaternary cyclic amidinium compound tends to cause leakage due to the reaction with the hydroxyl ion generated in the vicinity of the cathode leading means, however, the electrolyte solution used in the present invention seemingly has a less reactivity with the hydroxyl ion, and owing to the excellent sealability between the perforation hole of the sealing member and the lead wire, the leakage characteristic is further improved by these synergistic effects.

EMBODIMENTS

Subsequently, the present invention will be explained by using the embodiments. A capacitor element 1 is formed by winding an anode electrode foil and a cathode electrode foil via a separator. The anode electrode foil and the cathode electrode foil are connected respectively to a lead wire for leading the anode electrode and an another lead wire for leading the cathode electrode.

These lead wires are composed of connecting members being in contact with the electrode foils, and the rod members having been molded integrally with the connecting members 7, and outer connecting members having been fixed at the tip of the rod members. The connecting member and the rod member are made from aluminum of 99% purity while the outer connecting member is made of a copper-plated steel wire (hereinafter CP wire). On the surfaces of the rod members of the lead wires at least, anode oxide films made of aluminum oxide are formed by a chemical treatment with ammonium phosphate aqueous solution. These lead wires are connected respectively to the electrode foils at the connecting members by means of stitching, ultrasonic welding, and the like.

The anode electrode foil is made of an aluminum foil of 99.9% purity in an acidic solution thereby enlarging the surface area thereof through the chemical or electrochemical etching process, and then subjecting the aluminum foil to a chemical treatment in an ammonium adipate aqueous solution, to thereby form an anode oxidation film on the surface thereof.

The capacitor element, which impregnates the electrolyte solution, is then housed into a bottomed outer case made of aluminum. The outer case is provided at the opening with a sealing member and then sealed by drawing. The sealing member has perforation holes through which the lead wires are to be passed.

(Table 1) shows the electrolyte solution used in the present invention. As comparative example, the conventional electrolyte solution containing 90% by weight of γ-butyrolactone, and 10% by weight of hydrogen phthalate 1-ethyl-2,3-dimethyl-imidazolinium is used. The sparking voltage is 105V, and the specific resistance is 142 Ωcm.

According to the electrolytic capacitors which were constructed by using the electrolyte solution of above embodiments, the rated values of the electrolytic capacitors were 100 WV-33 μF, and the characteristics of the electrolytic capacitor were evaluated. The test conditions are 125° C. and 1,000 hours in the loaded state. The results are shown in (Table 2).

TABLE 1

|  | GBL | SL | A | Sparking Voltage (V) | Specific Resistance Ωcm |
|---|---|---|---|---|---|
| Embody 1 | 85 | 5 | 10 | 210 | 77 |
| Embody 2 | 80 | 10 | 10 | 207 | 80 |
| Embody 3 | 75 | 15 | 10 | 211 | 84 |
| Embody 2 | 70 | 20 | 10 | 204 | 88 |
| Compare | 90 | — | 10 | 205 | 73 |

GBL: γ-butyrolactone
SL: sulfolane
A: Tetraaluminate 1-ethyl-2,3-dimethyl-imidazolinium

TABLE 2

|  | Initial Characteristic | | 125° C./500 hours | |
|---|---|---|---|---|
|  | Cap (μF) | tan δ | Δcap (%) | tan δ |
| Embody 1 | 33.6 | 0.014 | −2.2 | 0.019 |
| Embody 2 | 33.5 | 0.014 | −2.2 | 0.019 |
| Embody 3 | 33.6 | 0.015 | −2.1 | 0.018 |
| Embody 4 | 33.5 | 0.015 | −2.0 | 0.017 |
| Compare | 33.5 | 0.014 | −2.0 | 0.023 |

Cap: electrostatic capacity
tan δ: tangent of dielectric loss
Δcap: change in electrostatic capacity As (Table 1) clearly shows, the sparking voltage of the electrolyte solution of the electrolytic capacitor of the embodiment is high, and the specific resistance ratio is low, compared with that of the conventional example. Also, as can be seen from (Table 2), the dielectric loss of coefficient (tan δ) of the electrolytic capacitor of 100 WV using this is low, and the high temperature life characteristic is excellent compared with that of the comparative example. The effectiveness of the present invention is apparent by replacing the sulfolane with the 1,3-diethyl-imidazoridinone.

As for first to third electrolytic capacitors, in case of using, as the sealing member, a partial cross-linking peroxide butyl rubber that added peroxide as cross-linking agent to a butyl rubber polymer comprised of isobutylene, isoprene, and divinylbenzene copolymer. Namely, the present invention achieves an extremely remarkable effect of preventing liquid leakage.

INDUSTRIAL APPLICABILITY

According to the present invention, the electrolyte solution containing the aluminum tetrafluoride salt and the solvent with high boiling point is used, such that the electrolytic capacitor having a low impedance characteristic and high withstand voltage characteristic, and excellent high temperature life characteristic and leakage characteristic are provided.

The invention claimed is:

1. An electrolyte solution for an electrolytic capacitor containing an aluminum tetrafluoride salt and a solvent with high boiling point.

2. An electrolyte solution for an electrolytic capacitor according to claim 1 wherein the solvent with high boiling point is sulfolane, 3-methyl sulfolane, or 2,4-dimethyl sulfolane.

3. An electrolytic capacitor using the electrolyte solution of claim 1.

4. An electrolytic capacitor according to claim 3, wherein an electrode foil subjected to a phosphate treatment is used as the anode electrode foil or the cathode electrode foil.

5. An electrolytic capacitor according to claim 3, wherein a partial cross-linking peroxide butyl rubber that peroxide is added as cross-linking agent to a butyl rubber polymer comprising a copolymer of isobutylene, isoprene, and divinylbenzene is used as the sealing member.